(12) United States Patent
Feng et al.

(10) Patent No.: US 12,467,362 B2
(45) Date of Patent: Nov. 11, 2025

(54) COAL-BASED SOLID WASTE TRANSPORT AND FILLING INTEGRATED MACHINE MINING SYSTEM AND METHOD

(71) Applicant: ANHUI UNIVERSITY OF SCIENCE AND TECHNOLOGY, Anhui (CN)

(72) Inventors: Feisheng Feng, Anhui (CN); Min Wang, Anhui (CN); Jiqiang Zhang, Anhui (CN); Tong Zhang, Anhui (CN); Qingyi Tu, Anhui (CN); Qisheng Chen, Anhui (CN)

(73) Assignee: ANHUI UNIVERSITY OF SCIENCE AND TECHNOLOGY, Anhui (CN)

( * ) Notice: Subject to any disclaimer, the term of this patent is extended or adjusted under 35 U.S.C. 154(b) by 257 days.

(21) Appl. No.: 18/227,411

(22) Filed: Jul. 28, 2023

(65) Prior Publication Data

US 2023/0383653 A1    Nov. 30, 2023

Related U.S. Application Data

(63) Continuation of application No. PCT/CN2022/137091, filed on Dec. 7, 2022.

(30) Foreign Application Priority Data

Jan. 14, 2022   (CN) .......................... 202210042007.4

(51) Int. Cl.
*E21D 23/04*    (2006.01)
*C04B 18/14*    (2006.01)
(Continued)

(52) U.S. Cl.
CPC ........ *E21D 23/0481* (2013.01); *C04B 18/141* (2013.01); *C04B 18/248* (2013.01);
(Continued)

(58) Field of Classification Search
CPC ..... E21D 23/0481; E21D 23/16; E21D 23/04; E21D 23/03; E21D 23/06; C04B 18/141;
(Continued)

(56) References Cited

U.S. PATENT DOCUMENTS 3,892,442 A  *  7/1975  Janssen ................... E21C 41/18
                                                            299/11
3,992,888 A  *  11/1976  Bemmerl ................ E21D 23/04
                                                            405/299

FOREIGN PATENT DOCUMENTS

CN        202012363 U     10/2011
CN        205025481 U      2/2016
(Continued)

OTHER PUBLICATIONS

International Search Report, PCT/CN2022/137091, Mar. 1, 2023.

*Primary Examiner* — Janine M Kreck
(74) *Attorney, Agent, or Firm* — troutman pepper locke; Tim Tingkang Xia, Esq.

(57) ABSTRACT

The present invention provides a coal-based solid waste transport and filling integrated machine mining system, comprising a filling hydraulic support (6) and a coal winning machine (7), said filling hydraulic support (6) comprises a hydraulic top plate and a base (601), said hydraulic top plate comprises a hinged front top beam (602) and a rear top beam (603), with a front probe beam (604) attached to front end of said front top beam (602) and a telescopic slide rod (1) connected to rear end of said rear top beam (603), a double transport and single filling non-stop equipment is fixed on the telescopic slide rod (1). The apparatus and method of the present invention weaken the impact of groundwater pollution on mine production and mine ecology, bring good economic and environmental benefits to the mine and promoting safe and green coal mining.

6 Claims, 4 Drawing Sheets

(51) Int. Cl.
*C04B 18/24* (2006.01)
*C04B 28/14* (2006.01)
*C04B 111/00* (2006.01)
*E21C 41/18* (2006.01)
*E21D 23/03* (2006.01)
*E21D 23/06* (2006.01)
*E21D 23/16* (2006.01)
*E21F 13/00* (2006.01)
*E21F 15/00* (2006.01)
*E21F 15/06* (2006.01)

(52) U.S. Cl.
CPC ............ *C04B 28/144* (2013.01); *E21C 41/18* (2013.01); *E21D 23/03* (2013.01); *E21D 23/04* (2013.01); *E21D 23/06* (2013.01); *E21F 13/00* (2013.01); *E21F 15/005* (2013.01); *E21F 15/06* (2013.01); *C04B 2111/00698* (2013.01); *E21D 23/16* (2013.01)

(58) Field of Classification Search
CPC ................ C04B 18/248; C04B 28/144; C04B 2111/00698; E21F 13/00; E21F 15/005; E21F 15/06; E21C 41/18
See application file for complete search history.

(56) References Cited

FOREIGN PATENT DOCUMENTS

| | | | |
|---|---|---|---|
| CN | 211029659 U | 7/2020 | |
| CN | 114370302 A | 4/2022 | |
| CN | 114412530 A | 4/2022 | |
| CN | 114622938 A | 6/2022 | |
| DE | 4106885 A1 | 9/1992 | |
| EP | 0250606 A1 * | 1/1988 | ......... E21D 23/0481 |
| FR | 2600116 A1 * | 12/1987 | ......... E21D 23/0017 |

* cited by examiner

COAL-BASED SOLID WASTE TRANSPORT AND FILLING INTEGRATED MACHINE MINING SYSTEM AND METHOD

CROSS-REFERENCE TO RELATED APPLICATION

This application is a continuation application of International Patent Application No. PCT/CN2022/137091, filed on Dec. 7, 2022, which itself claims priority to and benefit of Chinese Patent Application No. 202210042007.4 filed on Jan. 14, 2022 in the State Intellectual Property Office of P. R. China. The disclosure of each of the above applications is incorporated herein by reference in its entirety.

FIELD OF THE INVENTION

The present invention relates to the field of solid waste filling green mining in coal industry, and specifically to a coal-based solid waste transport and filling integrated machine mining system and method.

BACKGROUND OF THE INVENTION

Infill coal mining technology can effectively solve the problems of ground subsidence and gangue discharge, and has achieved good economic and social benefits in recent years. On the one hand, the current main filling materials such as gangue, fly ash, etc. contain heavy metal elements and some trace elements, such as Pb, Fe, Mn, Al, etc. On the other hand, other coal-based solid waste such as desulphurization gypsum and gasification slag can be used as raw materials for heavy metal adsorbent materials. The production of multi-source coal-based solid waste into a filling material that can adsorb heavy metals can provide the raw material for infill mining as well as reducing gangue emissions and solving the challenges of green treatment of multi-source coal-based solid waste, but a paradoxical problem with this design is that the adsorbent material is porous and cannot provide the compressive strength necessary for infill mining.

In addition, during infill mining, a large number of metal ions from the coal, rock strata and minerals in the filling material in the coal mine strata are dissolved into the mine water by groundwater leaching, already posing a significant risk to the surrounding environment and human life. However, current research rarely combines coal-based solid waste material preparation and groundwater pollution prevention.

SUMMARY OF THE INVENTION

The present invention provides a coal-based solid waste transport and filling integrated machine mining system and method.

An coal-based solid waste transport and filling integrated machine mining system, characterized in comprising a filling hydraulic support and a coal winning machine, the filling hydraulic support comprises a hydraulic top plate and a base, the hydraulic top plate comprises a hinged front top beam and a rear top beam, with a front probe beam attached to front end of the front top beam and a telescopic slide rod connected to rear end of the rear top beam, a double transport and single filling non-stop equipment is fixed on the telescopic slide rod;

the front top beam is connected to the base through a front column and a balance jack, and the rear top beam is connected to the base through an auxiliary column; at front end of the base the coal winning machine is connected by means of a scraper conveyor and at rear end of the base an aggregate compression system is connected;

the double transport and single filling non-stop equipment includes two transport and filling equipment with a symmetrical structure, the transport and filling equipment includes a top plate and a bottom plate connected by a rectangular baffle, upper end of the rectangular baffle is movably connected to one side of the top plate, and lower end of the rectangular baffle is fixedly connected to one side of the bottom plate, a transport belt is sheathed on the bottom plate;

inside the top plate, a steel rope shaft for winding a steel rope is arranged on a side opposite to the rectangular baffle, one end of the steel rope is fixed to one end of the steel rope shaft and the other end of the steel rope passes through the top plate and is connected to the upper end of an inclined baffle, a lower end of the inclined baffle is movably connected to the bottom plate, a spring is sheathed on the steel rope between the inclined baffle and the top plate, an upper part of the inclined baffle is inclined to outside of the transport and filling equipment and the steel rope shaft is connected to a control unit.

The coal-based solid waste transport and filling integrated machine mining system, wherein: the side provided with the inclined baffle is opening side, and the opening sides of the two the transport and filling equipment are oppositely arranged, and weight of upper end of the inclined baffle is greater than that of lower end.

The coal-based solid waste transport and filling integrated machine mining system, wherein: when the bottom plate is in a horizontal state, the spring is in a fully compressed state, at which time a height of the spring is 100 mm, a length of the inclined baffle in inclined direction is 412 mm, a vertical distance from top of the inclined baffle to the bottom plate is 400 mm and a distance between bottom of the inclined baffle and outer end of the bottom plate is 100 mm.

The coal-based solid waste transport and filling integrated machine mining system, wherein: a height of the rectangular baffle is 500 mm, a horizontal distance between a steel rope fixing point on the steel rope shaft and a penetration point of the steel rope on the top plate is 300 mm, the inclined baffle, the top plate, the bottom plate and the rectangular baffle have a length of 1.65 to 2.25 m along a direction of coal winning face.

The coal-based solid waste transport and filling integrated machine mining system, wherein: the two the transport and filling equipment are transport and filling equipment A and transport and filling equipment B, the double transport and single filling non-stop equipment is connected to the material transport system, the material transport system comprises a filling belt, a storage transit system and a filling system connected in sequence, the filling belt is connected to the above-ground batching silo and the filling system is connected to the filling equipment A or the filling equipment B, and the filling system comprises a first roller, a second roller, a third roller, a fourth roller and a fifth roller;

from working face outwards along roadway direction, the transport and filling equipment A is located downstream of the transport and filling equipment B, an upper left corner of the transport and filling equipment B is coordinate origin 0, along the roadway to the right i.e., a direction from the working face outwards along the roadway is x-axis, and upwards is y-axis i.e., a vertical upward direction; the transport and filling equipment A and the transport and filling equipment B have a width of 500 mm and an interval of 100 mm, the first roller has coordinates (1000 mm, 500 mm), the second roller has coordinates (1000 mm, 100 mm) and the third roller has coordinates (10 m to 50 m, −1 m to −2 m);

when the filling equipment B is operating, the fourth roller has coordinates (300 mm, 500 mm) and the fifth roller has coordinates (1050 m, 300 mm), when the filling equipment A is operating, the fourth roller has coordinates (900 mm, 400 mm) and the fifth roller has coordinates (1550 mm, 200 mm).

The coal-based solid waste transport and filling integrated machine mining system, wherein:

the aggregate compression system comprises:

a support base rod, one end of which is connected to rear end of the base, and the other end of which is connected to bottom of a compression plate;

a support diagonal rod, one end of which is connected to the base, the other end of which is connected to upper part of the compression plate, and a displacement sensor, an angle sensor and a pressure sensor are arranged on the support diagonal rod, and a gangue baffle is arranged at lower part of the support diagonal rod;

a support top rod, both ends of which are respectively connected to the rear top beam and the support diagonal rod;

the support base rod, the support diagonal rod and the support top rod are all hydraulic rods;

the compression plate comprises an upper slide plate and a lower baffle, the upper slide plate is connected to the support diagonal rod, both sides of the plate body of the lower baffle are curled inwardly to form a slideway, and both sides of the upper slide plate have protrusions which slide freely within the slideway.

A method for wall filling using the coal-based solid waste transport and filling integrated machine mining system, wherein: comprising following steps of:

(I) preparation of filling materials: pressure-bearing material or adsorbent material are prepared in above-ground batching silo;

(II) preparation of apparatus: a plurality of the coal-based solid waste transport and filling integrated machine mining system are arranged along direction of coal winning face, wherein transport belts of a plurality of the filling equipments A are closely connected and transport belts of a plurality of the filling equipments B are closely connected, a first the coal-based solid waste transport and filling integrated machine mining system is connected in turn to filling system, storage transit system, filling belt and the above-ground batching silo;

(III) Transport and fabrication of the infill wall: the batching silo releases the filling material of mass Q, the filling belt transports the filling material in turn to the storage transit system, the filling system and the filling equipment A underground, Q is an amount of infill per stack of walls, $Q=L_1*m*h*\delta$, wherein $L_1$ is width of a stack of infill walls, m is strike length of the working face, h is thickness of coal seam and $\delta$ is filling factor of the filling material; a stack of infill walls is divided into p infills with a filling time of t; the filling belt operates at a speed of $p*(m/t)$ and the storage transit system releases the filling material at a flow rate of $(Q/p)*m$, when a release time of the storage system is t/p, the transport belt of the filling equipment A is just filled with a layer of filling material, at this point, positions of the fourth roller and the fifth roller are switched to continue transporting the filling material from the filling system to the transport and filling equipment B, at the same time, the steel rope controlling the filling equipment A extends and the bottom plate opens to release the filling material in the filling equipment A into an extraction area, and the aggregate compression system compresses the filling material to complete the first compression, the compression time is less than t/p, when the time reaches t/p and the transport and filling equipment B is just full of a layer of filling material, the positions of the fourth roller and the fifth roller are switched again and the filling material from the filling system continues to be transported to the transport and filling equipment A, at the same time, the steel rope controlling the filling equipment B extends and the bottom plate opens to release the filling material in the filling equipment B into an extraction area, and the aggregate compression system compresses the filling material to complete the second compression, it is repeated until the p-th compression is completed, that is, the filling of a stack of infill walls is completed;

wherein, each aggregate compression process comprises following steps:

the filling height is $N\delta h/p$, an angle between the support diagonal rod and the support base rod is $\alpha_{incline}$, an obtuse angle between the compression plate and the support base rod is $\alpha_{compression}$, taking the lower right corner of the first stack of infill walls as the origin, a direction to the left, i.e. back away from the extraction area, is x-positive direction and upwards is y-axis positive direction, during the material preparation stage, coordinates of intersection point R of the support diagonal rod and the compression plate are set as $$\left(N\delta h/p/\tan(180° - \alpha_{compression}) + \sum_{1}^{n-1} L_i, N\delta h/p\right)$$

and coordinates of intersection point S of the support base rod (608) and the compression plate are set as $$\left(\sum_{1}^{n-1} L_i, 0\right),$$

when the filling material is released, the support top rod and the support diagonal rod are adjusted so that coordinates of the intersection of the support top rod and the compression plate are set as $$\left(\sum_{1}^{n-1} L_i, N\delta h/p\right),$$

and coordinates of the intersection point S of the support base rod and the compression plate are set as $$\left(\sum_{1}^{n-1} L_i, 0\right).$$

that is, the compression plate is in a vertical state, then the support top rod, the support diagonal rod and the support base rod are simultaneously adjusted to horizontally compress the wall so that the compression plate simultaneously translates to the right by $\Delta L_1$, ensuring compression to predetermined filling width;

wherein, N is a number of compressions, and N is 1 to p;

i is a number of completed stacks, i is 0 to n, n≥0, and is an integer;

$L_i$ represents width of the i-th stack of infill walls;

(IV) as coal mining advances, after a coal miner has mined one cut-off distance of coal, all the filling hydraulic supports move forward and after completing filling of one stack of infill walls, the transport and filling equipment A, the transport and filling equipment B, the fourth roller and the fifth roller move synchronously towards advancing direction of the working face for a moving distance of width of the previous stack of infill walls; the support diagonal rod and support base rod move according to the predetermined coordinates; step (III) is repeated to complete filling of the next stack of infill walls;

(VI) step (IV) is repeated until all infill walls are filled.

The method for wall filling, wherein:

δ is 0.93 when the filling material is a pressure-bearing material, p=4 when h is between 0 and 3 m, and p=6 when h is greater than 3 m;

δ is 0.88 when the filling material is an adsorbent material, p=6 when h is between 0 and 3 m, and p=8 when h is greater than 3 m;

$\alpha_{compression}$ is 110° to 130°.

The method for wall filling, wherein:

a preparation method for the pressure-bearing material comprises following steps:

taking raw materials with a mass ratio of gangue:fly ash:desulfurization gypsum:furnace bottom slag:gasification slag:straw=30:12:10:5:3:40, drying, crushing, sieving and mixing evenly, putting them into a crucible and compacting, calcining in a muffle furnace, heating up at a heating rate of 20° C./min, holding at 700° C. for 50 min, and holding at 900° C. for 50 min;

a preparation method for the adsorbent material comprises following steps:

taking raw materials with a mass ratio of gangue:fly ash:cement:water=8:1:1.1:1.4, mixing and stirring evenly, wherein the gangue has a crushing particle size≤25 mm.

The apparatus and method of the present invention produce high initial strength adsorbent and filling materials from multiple sources of coal-based solid waste in suitable geological conditions in the working face. Based on accurate calculation of mine pressure, optimizing the pressure-bearing ratio, proposing a double-section filling process with corresponding filling equipment and methods, this infill wall, while meeting the requirements of filling support strength, can adsorb and solidify minerals in coal, rock and filling materials in coal mine strata through its own adsorption, weakening the migration of heavy metal elements, weakening the impact of groundwater pollution on mine production and mine ecology, bringing good economic and environmental benefits to the mine and promoting safe and green coal mining, as reflected in the following points.

1. The adsorption filling aggregate is a porous material, which has an inverse relationship with the pressure-bearing characteristics. The stronger the adsorption performance is, the worse the pressure-bearing strength is. The preparation method of the pressure-bearing material in the present invention can improve the adsorption capacity as much as possible by calcining and other means, and the width ratio of the adsorption filling material and the pressure-bearing adsorbent material ensures the pressure-bearing effect and adsorption effect.

2. Conventional infill mining methods and equipment use a single type of filling pressure-bearing aggregate. These aggregates, including gangue and fly ash, contain heavy metal elements, and there are also some trace elements and heavy metals from the coal in the coal mine strata and the leaching of minerals in the rock formations, a large number of metal ions dissolved into the mine water, has produced a major hazard to the surrounding environment and human life. The present invention proposes a double section filling process, incorporating the filling of adsorbent materials, which can effectively adsorb pollutants and heavy metals from the filling aggregate, pushing the mining process to a new and more environmentally friendly level and greatly improving the promotion of the filling process.

3. Conventional filling methods and equipment stop the transport of the filling aggregate in the belt when it needs to be refilled and compressed, as there is no device to store the aggregate and the belt machine is switched between open and closed with high frequency, which affects both the filling speed and the service life. The present invention uses a non-stop equipment, which enables long sequential non-stop operation of the filling aggregates, ensuring filling stability and filling efficiency.

4. Traditional filling and mining methods and equipment seriously affect the mining speed. The present invention proposes a double section filling process without stopping apparatus and matching corresponding filling equipment and methods, which can ensure that the filling speed is synchronized with the mining speed and greatly improves the promotion of the filling process, even for the filling of a single aggregate, this method is also of great advantage.

5. The aggregate compression system of the present invention realizes automatic and intelligent operation, and the coordinates and trajectory of each key equipment are all standardized and refined, which can realize the standardized production of compressed fast aggregates and infill walls, which greatly promotes the production effect and speed of infill walls, and greatly improves the filling speed.

6. The aggregate filling system of the present invention has a storage transit system, which ensures a small adjustment of the flow and speed of the filling aggregate in extreme situations and increases the reliability and stability of the complete equipment.

The coal-based solid waste transport and filling integrated machine mining system and method of the present invention will be further described below in conjunction with the accompanying drawings.

BRIEF DESCRIPTION OF THE DRAWINGS

Additional objectives, functions and advantages of the present invention will be set forth in the description of embodiments which follow, with reference to the accompanying drawings in which.

DETAILED DESCRIPTION OF THE INVENTION

Figure 1:
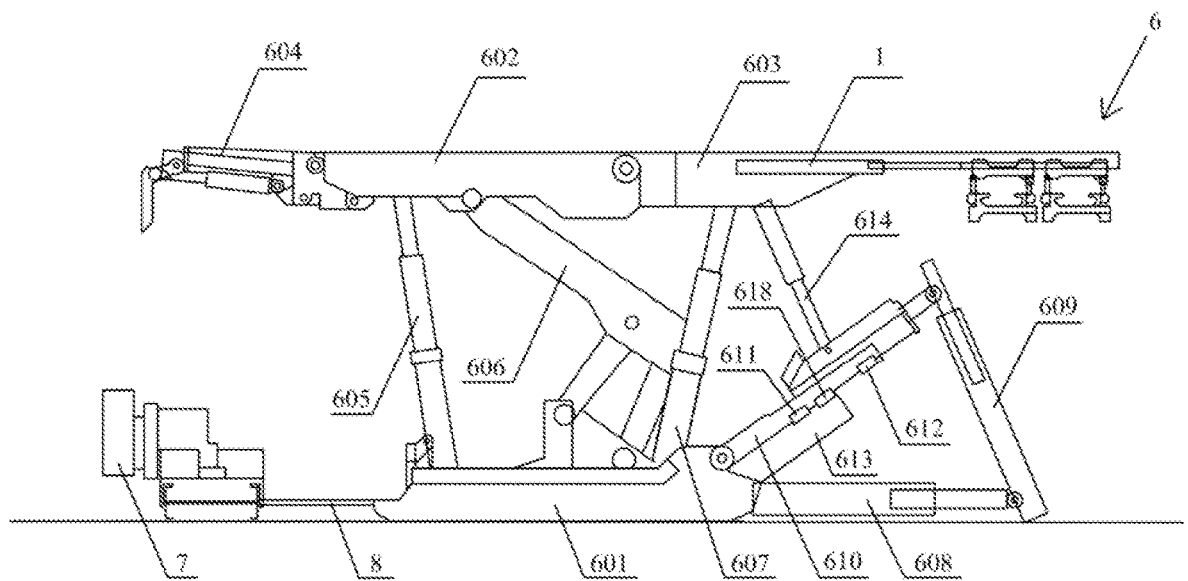
FIG. 1 shows a schematic diagram of the structure of the coal-based solid waste transport and filling integrated machine mining system of the present invention.
Figure 2:
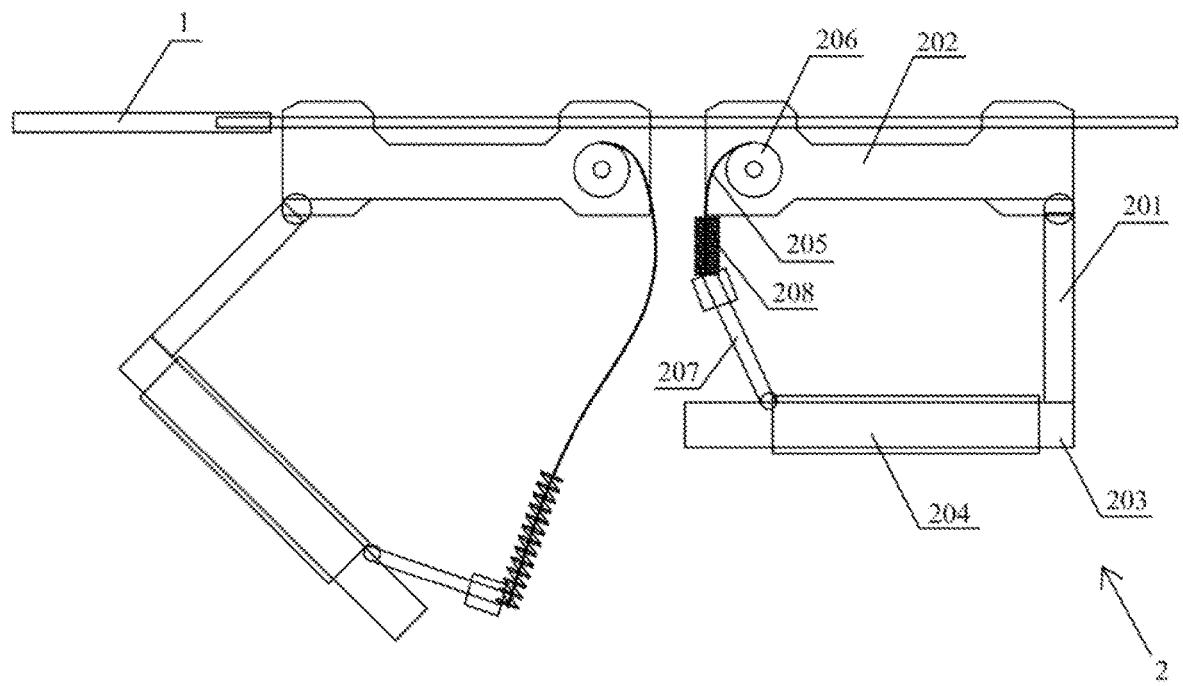
FIG. 2 shows a schematic diagram of the structure of the double transport and single filling non-stop equipment of the present invention.
Figure 3:
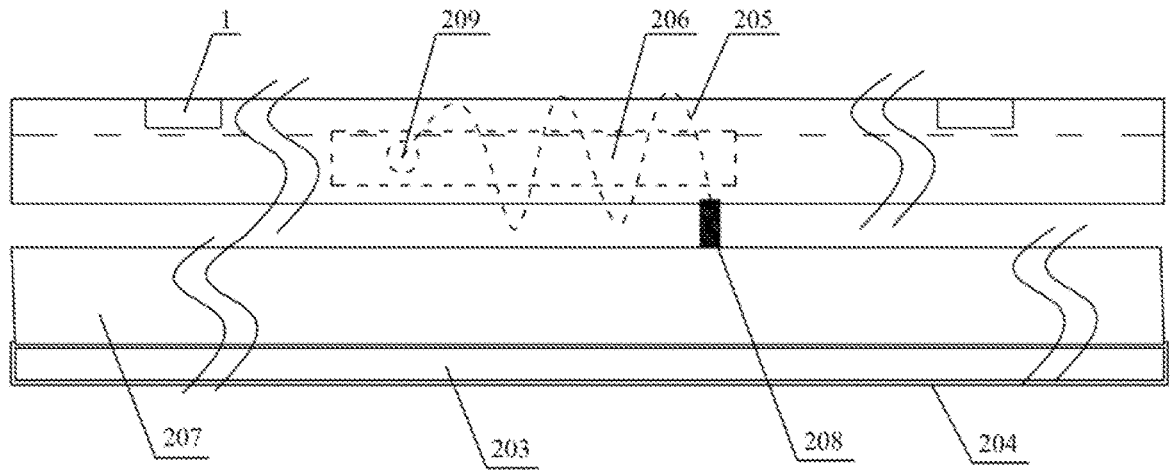
FIG. 3 shows a left view of the transport and filling equipment located on the right side in FIG. 1.
Figure 4:
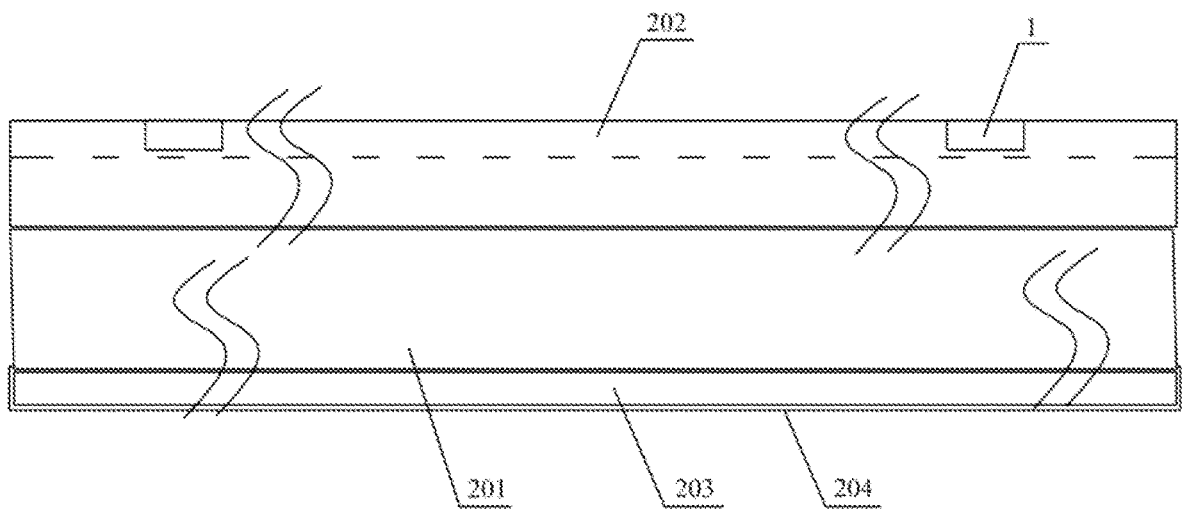
FIG. 4 shows a right view of the transport and filling equipment located on the right side in FIG. 1.
Figure 5:
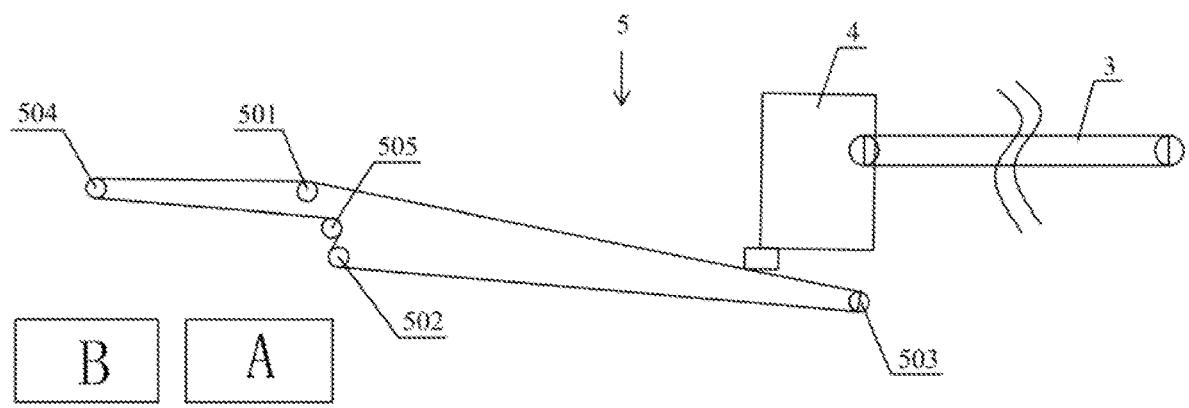
FIG. 5 shows a schematic diagram of the structure of the material transport system of the present invention when feeding material to the filling equipment A.
Figure 6:
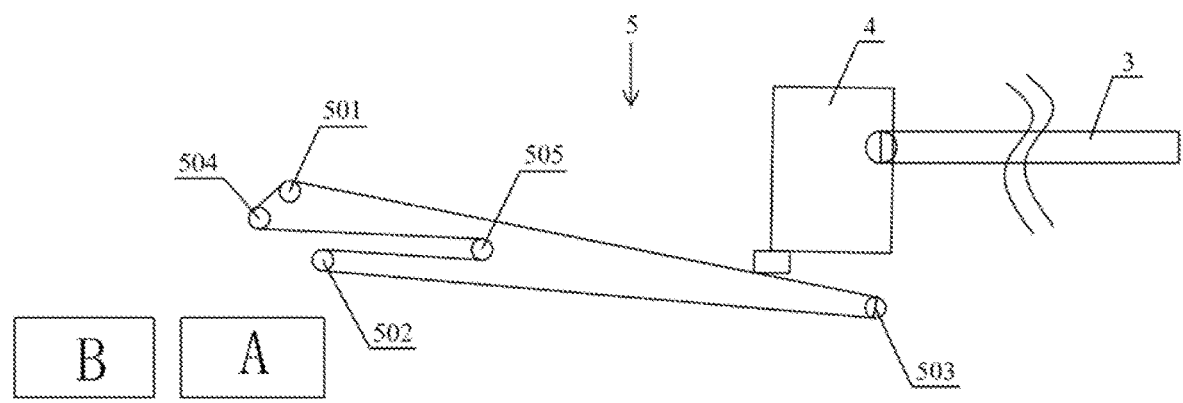
FIG. 6 shows a schematic diagram of the structure of the material transport system of the present invention when feeding material to the filling equipment B.
Figure 7:
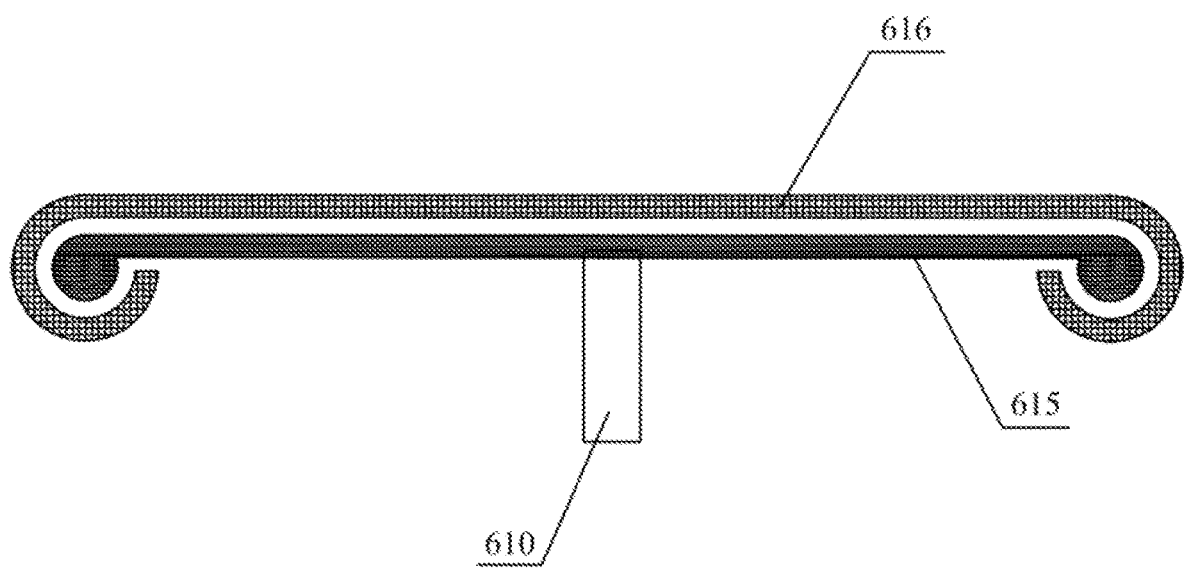
FIG. 7 shows a schematic diagram of the structure of the compression plate in the present invention.

As shown in FIGS. 1 to 7, an coal-based solid waste transport and filling integrated machine mining system, characterized in comprising a filling hydraulic support 6 and a coal winning machine 7, the filling hydraulic support 6 comprises a hydraulic top plate and a base 601, the hydraulic top plate comprises a hinged front top beam 602 and a rear top beam 603, with a front probe beam 604 attached to front end of the front top beam 602 and a telescopic slide rod 1 connected to rear end of the rear top beam 603, a double transport and single filling non-stop equipment is fixed on the telescopic slide rod 1. The telescopic slide rod 1 allows the double transport and single filling non-stop equipment to be moved relative to the mining direction of the working face by stretching and contracting.

The front top beam 602 is connected to the base 601 through a front column 605 and a balance jack 606, and the rear top beam 603 is connected to the base 601 through an auxiliary column 607; at front end of the base 601 the coal winning machine 7 is connected by means of a scraper conveyor 8 and at rear end of the base 601 an aggregate compression system is connected.

The double transport and single filling non-stop equipment includes two transport and filling equipment 2 with a symmetrical structure, the transport and filling equipment 2 includes a top plate 202 and a bottom plate 203 connected by a rectangular baffle 201, upper end of the rectangular baffle 201 is movably connected to one side of the top plate 202, and lower end of the rectangular baffle 201 is fixedly connected to one side of the bottom plate 203, a transport belt 204 is sheathed on the bottom plate 203.

Inside the top plate 202, a steel rope shaft 206 for winding a steel rope 205 is arranged on a side opposite to the rectangular baffle 201, the steel rope shaft 206 tightens or loosens the steel rope 205 by rotating, so that the bottom plate 203 is in a closed or open state, one end of the steel rope 205 is fixed to one end of the steel rope shaft 206 and the other end of the steel rope 205 passes through the top plate 202 and is connected to the upper end of an inclined baffle 207, a lower end of the inclined baffle 207 is movably connected to the bottom plate 203, a spring 208 is sheathed on the steel rope 205 between the inclined baffle 207 and the top plate 202, an upper part of the inclined baffle 207 is inclined to outside of the transport and filling equipment 2, and the steel rope shaft 206 is connected to a control unit.

Preferably, the opening sides of the two transport and filling equipment 2 are arranged opposite to each other, the opening direction set in the interior can make the two transport and filling equipment 2 more compact, which helps to ensure that the equipment is effective and feasible in a small space, while the opening direction set in the exterior will be stuck.

When the bottom plate 203 is in a horizontal state, the spring 208 is in a fully compressed state, at which time a height of the spring 208 is 100 mm, a length of the inclined baffle 207 in inclined direction is 412 mm, a vertical distance from top of the inclined baffle 207 to the bottom plate 203 is 400 mm and a distance between bottom of the inclined baffle 207 and outer end of the bottom plate 203 is 100 mm. It can be ensured that in the closed state, the inclined baffle 207 is in a relatively vertical state with the upper part slightly outward, which can ensure that the transport belt 204 has a greater carrying capacity under the same bottom area. The upper end of the inclined baffle 207 is heavier than the lower end, when in the open state, because the inclined baffle 207 was in a relatively vertical state with the upper part slightly outward, so under the action of its own gravity and the gravity of the carrying material, the inclined baffle 207 will have a greater inclination, so that all the materials on the transport belt 204 can be dumped out without the obstruction of the inclined baffle 207. In addition, after the spring 208 is released from compression, an extra stress is given to the bottom plate 203 to make it more inclined, and the materials can be dumped more completely.

A height of the rectangular baffle 201 is 500 mm, a horizontal distance between a steel rope fixing point 209 on the steel rope shaft 206 and a penetration point of the steel rope 205 on the top plate 202 is 300 mm, the main purpose is to make the steel rope shaft 206 appear spiral when rotating in a narrow space, so that the winding accumulation state of the steel rope 205 will not occur, so as to avoid knotting caused by the winding accumulation of the steel rope 205 in a small space, and greatly improve the equipment stability. The inclined baffle 207, the top plate 202, the bottom plate 203 and the rectangular baffle 201 have a length of 1.65 to 2.25 m along a direction of coal winning face.

The two the transport and filling equipment 2 are transport and filling equipment A and transport and filling equipment B, the double transport and single filling non-stop equipment is connected to the material transport system, the material transport system comprises a filling belt 3, a storage transit system 4 and a filling system 5 connected in sequence, the filling belt 3 is connected to the above-ground batching silo and the filling system 5 is connected to the filling equipment A or the filling equipment B, and the filling system 5 comprises a first roller 501, a second roller 502, a third roller 503, a fourth roller 504 and a fifth roller 505. The other rollers in the filling system 5 are conventional technology and will not be described in details.

From working face outwards along roadway direction, the transport and filling equipment A is located downstream of the transport and filling equipment B, an upper left corner of the transport and filling equipment B is coordinate origin 0, along the roadway to the right i.e., a direction from the working face outwards along the roadway is x-axis, and upwards is y-axis i.e., a vertical upward direction; the transport and filling equipment A and the transport and filling equipment B have a width of 500 mm and an interval of 100 mm, the first roller 501 has coordinates 1000 mm, 500 mm, the second roller 502 has coordinates 1000 mm, 100 mm and the third roller 503 has coordinates 10 m to 50 m, −1 m to −2 m; when the filling equipment B is operating, the fourth roller 504 has coordinates 300 mm, 500 mm and the fifth roller 505 has coordinates 1050 m, 300 mm, when the filling equipment A is operating, the fourth roller 504 has coordinates 900 mm, 400 mm and the fifth roller 505 has coordinates 1550 mm, 200 mm.

The 5 rollers are designed to achieve automatic switching of the feed, ensuring that the transport belt 204 does not interrupt transport and that automatic operation is achieved. The movement of the fourth roller 504 and the fifth roller 505 ensures both automatic switching of the feed and the fixation of the belt machine without slipping. The position of the first roller 501 and the third roller 503 ensures that the feeding system starts from the roadway floor and transports to the filling equipment A and the filling equipment B at a suitable inclined climbing angle. This not only makes full use of the small space underground, but also makes it easier for workers to check the feeding situation and also provides a maximum possible storage space for the storage transit system 4, which increases the stability, reliability and mobility of the system.

The aggregate compression system comprises:
  a support base rod 608, one end of which is connected to rear end of the base 601, and the other end of which is connected to bottom of a compression plate 609; the support base rod 608 controls the displacement of the compression plate 609 through the expansion and contraction of the hydraulic rod, playing a role in compressing and filling the aggregate;
  a support diagonal rod 610, one end of which is connected to the base 601, the other end of which is connected to upper part of the compression plate 609, and a displacement sensor 618, an angle sensor 611 and a pressure sensor 612 are arranged on the support diagonal rod 610, and a gangue baffle 613 is arranged at lower part of the support diagonal rod 610;
  a support top rod 614, both ends of which are respectively connected to the rear top beam 603 and the support diagonal rod 610; during material preparation, the angle of the compression plate 609 is ensured to be greater than 120°, when pressing the material, the compression plate 609 is ensured to be 90° vertical and compressed to the right simultaneously, a gangue baffle 613 is provided in the lower part of the support diagonal rod 610, the support diagonal rod 610 controls the angle of the compression plate 609 through the expansion and contraction of the hydraulic rod;
  the support top rod 614, the ends of which are connected to the rear top beam 603 and the support diagonal rod 610 respectively, controls the angle of the support diagonal rod 610, and the telescopic length and angle of the binder plate 609 through the stretch and contraction of the hydraulic rod;
  the support base rod 608, the support diagonal rod 610 and the support top rod 614 are all hydraulic rods;
  the compression plate 609 comprises an upper slide plate 615 and a lower baffle 616, the upper slide plate 615 is connected to the support diagonal rod 610, both sides of the plate body of the lower baffle 616 are curled inwardly to form a slideway, and both sides of the upper slide plate 615 have protrusions which slide freely within the slideway.

Coal winning machine 7, scraper conveyor 8, balancing jack 606, telescopic slide rod 1, support top rod 614, support diagonal rod 610, support base rod 608, angle sensor 611, pressure sensor 612 and displacement sensor 618 are all connected to the control unit.

A method for wall filling using the coal-based solid waste transport and filling integrated machine mining system, comprising following steps of:
  (I) preparation of filling materials: pressure-bearing material or adsorbent material are prepared in above-ground batching silo;
  (II) preparation of apparatus: a plurality of the coal-based solid waste transport and filling integrated machine mining system are arranged along direction of coal winning face, wherein transport belts 204 of a plurality of the filling equipments A are closely connected and transport belts 204 of a plurality of the filling equipments B are closely connected, a first the coal-based solid waste transport and filling integrated machine mining system is connected in turn to filling system 5, storage transit system 4, filling belt 3 and the above-ground batching silo;
  (III) transport and fabrication of the infill wall: the batching silo releases the filling material of mass Q, the filling belt 3 transports the filling material in turn to the storage transit system 4, the filling system 5 and the filling equipment A underground, Q is an amount of infill per stack of walls, $Q = L_1 * m * h * \delta$, wherein $L_1$ is width of a stack of infill walls, m is strike length of the working face, h is thickness of coal seam and $\delta$ is filling factor of the filling material; a stack of infill walls is divided into p infills with a filling time of t; the filling belt 3 operates at a speed of $p*m/t$ and the storage transit system 4 releases the filling material at a flow rate of $Q/p*m$, when a release time of the storage system is $t/p$, the transport belt 204 of the filling equipment A is just filled with a layer of filling material, at this point, positions of the fourth roller 504 and the fifth roller 505 are switched to continue transporting the filling material from the filling system 5 to the transport and filling equipment B, at the same time, the steel rope 205 controlling the filling equipment A extends and the bottom plate 203 opens to release the filling material in the filling equipment A into an extraction area, and the aggregate compression system compresses the filling material to complete the first compression, the compression time is less than $t/p$, when the time reaches $t/p$ and the transport and filling equipment B is just full of a layer of filling material, the positions of the fourth roller 504 and the fifth roller 505 are switched again and the filling material from the filling system 5 continues to be transported to the transport and filling equipment A, at the same time, the steel rope 205 controlling the filling equipment B extends and the bottom plate 203 opens to release the filling material in the filling equipment B into an extraction area, and the aggregate compression system compresses the filling material to complete the second compression, it is repeated until the p-th compression is completed, that is, the filling of a stack of infill walls is completed;
wherein, each aggregate compression process comprises following steps:
  the filling height is $N\delta h/p$, an angle between the support diagonal rod 610 and the support base rod 608 is $\alpha_{incline}$, an obtuse angle between the compression plate 609 and the support base rod 608 is $\alpha_{compression}$, taking the lower right corner of the first stack of infill walls as the origin, a direction to the left, i.e. back away from the extraction area, is x-positive direction and upwards is y-axis positive direction, during the material preparation stage, coordinates of intersection point R of the support diagonal rod 610 and the compression plate 609 are set as $$N\delta h/p/\tan 180° - \alpha_{compression} + \sum_{1}^{n-1} L_i, N\delta h/p$$

and coordinates of intersection point S of the support base rod 608 and the compression plate 609 are set as $$\sum_{1}^{n-1} L_i, 0,$$

when the filling material is released, the support top rod 614 and the support diagonal rod 610 are adjusted so that coordinates of the intersection of the support top rod 610 and the compression plate 609 are set as $$\sum_{1}^{n-1} L_i, N\delta h/p,$$

and coordinates of the intersection point S of the support base rod 608 and the compression plate 609 are set as $$\sum_{1}^{n-1} L_i, 0,$$

that is, the compression plate 609 is in a vertical state, then the support top rod 614, the support diagonal rod 610 and the support base rod 608 are simultaneously adjusted to horizontally compress the wall so that the compression plate 609 simultaneously translates to the right by $\Delta L_1$, ensuring compression to predetermined filling width;
wherein, N is a number of compressions, and N is 1 to p;
i is a number of completed stacks, i is 0 to n, n≥0, and is an integer;
$L_i$ represents the width of the i-th stack of infill walls, and i is a natural integer from 1 to n;
$L_1$ is the width of a stack of infill walls, $\Delta L_1$ is the value of the distance over which the infill wall is compressed to provide support pressure, which is the difference between the width of the original infill wall and the width of the infill wall after it has been compressed; this value is determined by the filling requirements of the coal mine and the capacity of the equipment in accordance with the construction programme on site and is a common technical parameter in the industry;
(IV) as coal mining advances, after a coal miner 7 has mined one cut-off distance of coal, all the filling hydraulic supports 6 move forward and after completing filling of one stack of infill walls, the transport and filling equipment A, the transport and filling equipment B, the fourth roller 504 and the fifth roller 505 move synchronously towards advancing direction of the working face for a moving distance of width of the previous stack of infill walls; the support diagonal rod 610 and support base rod 608 move according to the predetermined coordinates; step III is repeated to complete filling of the next stack of infill walls;
(VI) step (IV) is repeated until all infill walls are filled.
$\delta$ is 0.93 when the filling material is a pressure-bearing material, p=4 when h is between 0 and 3 m, and p=6 when h is greater than 3 m;
$\delta$ is 0.88 when the filling material is an adsorbent material, p=6 when h is between 0 and 3 m, and p=8 when h is greater than 3 m;
$\alpha_{compression}$ is 110° to 130°.

A preparation method for the pressure-bearing material comprises following steps:
taking raw materials with a mass ratio of gangue:fly ash:desulfurization gypsum:furnace bottom slag:gasification slag:straw=30:12:10:5:3:40, drying, crushing, sieving and mixing evenly, putting them into a crucible and compacting, calcining in a muffle furnace, heating up at a heating rate of 20° C./min, holding at 700° C. for 50 min, and holding at 900° C. for 50 min;
a preparation method for the adsorbent material comprises following steps:
taking raw materials with a mass ratio of gangue:fly ash:cement:water=8:1:1.1:1.4, mixing and stirring evenly, wherein the gangue has a crushing particle size≤25 mm.

In step (IV), as the coal mining advances, after the coal winning machine has mined the coal, i.e. the distance of one cutter pick, the surrounding filling hydraulic supports 6 move forward in accordance with the normal frame shifting process. In the course of the individual frame shifting, the transport and filling equipment A and transport and filling equipment B in the rear row of the hydraulic support are kept in position by sliding on the telescopic slide rod 1 and extending the telescopic rod so that all transport and filling equipment A and B form a straight line and are in the protection of the hydraulic support. The efficient filling efficiency of the double transport and single filling equipment will also ensure that the filling system speed keeps up with the coal mining speed and the pushing speed of the filling hydraulic support 6, i.e. the back filling system will not be synchronized with the coal mining system, but the overall speed is the same, ensuring that both operate separately but also within the speed of the coal mining advance, ensuring that the entire filling and pressing time of a stack of infill walls is just within the mining time of a cut of coal. In the event of extreme conditions such as material jamming, where the entire filling and pressing time of a stack of infill walls is greater than the mining time of a cut of coal, it is sufficient to suspend the mining process after mining a cut of coal to complete the filling and pressing process.

What is claimed is:
1. A coal-based solid waste transport and filling integrated machine mining system, comprising a filling hydraulic support (6) and a coal winning machine (7), wherein:
said filling hydraulic support (6) comprises a hydraulic top plate and a base (601), said hydraulic top plate comprises a hinged front top beam (602) and a rear top beam (603), with a front probe beam (604) attached to a front end of said front top beam (602) and a telescopic slide rod (1) connected to a rear end of said rear top beam (603), and a double transport and single filling non-stop equipment is fixed on the telescopic slide rod (1);
said front top beam (602) is connected to said base (601) through a front column (605) and a balance jack (606), and said rear top beam (603) is connected to said base (601) through an auxiliary column (607); and at a front end of said base (601) said coal winning machine (7) is connected by means of a scraper conveyor (8) and at a rear end of said base (601) an aggregate compression system is connected;
said double transport and single filling non-stop equipment includes two transport and filling equipment (2) with a symmetrical structure, each said transport and filling equipment (2) includes a top plate (202) and a bottom plate (203) connected by a rectangular baffle (201), an upper end of said rectangular baffle (201) is movably connected to one side of said top plate (202), and a lower end of said rectangular baffle (201) is fixedly connected to one side of said bottom plate (203), and a transport belt (204) is sheathed on said bottom plate (203);

inside said top plate (202), a steel rope shaft (206) for winding a steel rope (205) is arranged on a side opposite to said rectangular baffle (201), one end of said steel rope (205) is fixed to one end of said steel rope shaft (206) and the other end of said steel rope (205) passes through said top plate (202) and is connected to an upper end of an inclined baffle (207), a lower end of said inclined baffle (207) is movably connected to said bottom plate (203), a spring (208) is sheathed on said steel rope (205) between said inclined baffle (207) and said top plate (202), an upper part of said inclined baffle (207) is inclined to outside of each said transport and filling equipment (2), and said steel rope shaft (206) is connected to a control unit.

2. The coal-based solid waste transport and filling integrated machine mining system according to claim 1, characterized in that a side provided with said inclined baffle (207) is an opening side, and the opening sides of the two said transport and filling equipment (2) are oppositely arranged, and a weight of the upper end of said inclined baffle (207) is greater than a weight of the lower end of said inclined baffle (207).

3. The coal-based solid waste transport and filling integrated machine mining system according to claim 2, characterized in that when said bottom plate (203) is in a horizontal state, said spring (208) is in a fully compressed state, at which time a height of said spring (208) is 100 mm, a length of said inclined baffle (207) in an inclined direction is 412 mm, a vertical distance from a top of said inclined baffle (207) to said bottom plate (203) is 400 mm and a distance between a bottom of said inclined baffle (207) and an outer end of said bottom plate (203) is 100 mm.

4. The coal-based solid waste transport and filling integrated machine mining system according to claim 3, characterized in that a height of said rectangular baffle (201) is 500 mm, a horizontal distance between a steel rope fixing point (209) on said steel rope shaft (206) and a penetration point of said steel rope (205) on said top plate (202) is 300 mm, and said inclined baffle (207), said top plate (202), said bottom plate (203) and said rectangular baffle (201) have a length of 1.65 to 2.25 m along a direction of a coal winning face.

5. The coal-based solid waste transport and filling integrated machine mining system according to claim 4, characterized in that the two said transport and filling equipment (2) are transport and filling equipment A and transport and filling equipment B, said double transport and single filling non-stop equipment is connected to the material transport system, said material transport system comprises a filling belt (3), a storage transit system (4) and a filling system (5) connected in sequence, said filling belt (3) is connected to an above-ground batching silo and said filling system (5) is connected to said transport and filling equipment A or said transport and filling equipment B, and said filling system (5) comprises a first roller (501), a second roller (502), a third roller (503), a fourth roller (504) and a fifth roller (505);

wherein along an outward direction from a working face along a roadway, said transport and filling equipment A is located downstream of said transport and filling equipment B, an upper left corner of said transport and filling equipment B is a coordinate origin 0, along the outward direction from the working face along the roadway rightward is an x-axis, and a vertical upward direction is a y-axis; said transport and filling equipment A and said transport and filling equipment B have a width of 500 mm and an interval of 100 mm, said first roller (501) has coordinates (1000 mm, 500 mm), said second roller (502) has coordinates (1000 mm, 100 mm) and said third roller (503) has coordinates (10 m to 50 m, −1 m to −2 m);

wherein when said transport and filling equipment B is operating, said fourth roller (504) has coordinates (300 mm, 500 mm) and said fifth roller (505) has coordinates (1050 m, 300 mm), when said transport and filling equipment A is operating, said fourth roller (504) has coordinates (900 mm, 400 mm) and said fifth roller (505) has coordinates (1550 mm, 200 mm).

6. The coal-based solid waste transport and filling integrated machine mining system according to claim 5, characterized in that said aggregate compression system comprises:
a support base rod (608), wherein one end of the support base rod (608) is connected to rear end of said base (601), and the other end of the support base rod (608) is connected to bottom of a compression plate (609);
a support diagonal rod (610), wherein one end of the support diagonal rod (610) is connected to said base (601), the other end of the support diagonal rod (610) is connected to upper part of said compression plate (609), a displacement sensor (618), an angle sensor (611) and a pressure sensor (612) are arranged on the support diagonal rod (610), and a gangue baffle (613) is arranged at a lower part of said support diagonal rod (610); and
a support top rod (614), wherein both ends of the support top rod (614) are respectively connected to said rear top beam (603) and said support diagonal rod (610);
wherein said support base rod (608), said support diagonal rod (610) and said support top rod (614) are all hydraulic rods;
wherein said compression plate (609) comprises an upper slide plate (615) and a lower baffle (616), said upper slide plate (615) is connected to said support diagonal rod (610), both sides of a plate body of said lower baffle (616) are curled inwardly to form a slideway, and both sides of the upper slide plate (615) have protrusions which slide freely within said slideway.

* * * * *